(12) United States Patent
Marchlewski et al.

(10) Patent No.: US 11,204,069 B2
(45) Date of Patent: Dec. 21, 2021

(54) METHOD FOR CARRYING OUT LAUNCH CONTROL STARTING OPERATIONS

(71) Applicants: Volkswagen Aktiengesellschaft, Wolfsburg (DE); BorgWarner Inc., Auburn Hills, MI (US)

(72) Inventors: Marko Marchlewski, Weyhausen (DE); Danny Grosser, Dresden (DE)

(73) Assignees: VOLKSWAGEN AKTIENGESELLSCHAFT, Wolfsburg (DE); BORGWARNER INC., Auburn Hills, MI (US)

( * ) Notice: Subject to any disclaimer, the term of this patent is extended or adjusted under 35 U.S.C. 154(b) by 32 days.

(21) Appl. No.: 16/331,753

(22) PCT Filed: Sep. 7, 2017

(86) PCT No.: PCT/EP2017/072442
§ 371 (c)(1),
(2) Date: Mar. 8, 2019

(87) PCT Pub. No.: WO2018/046587
PCT Pub. Date: Mar. 15, 2018

(65) Prior Publication Data
US 2019/0249728 A1    Aug. 15, 2019

(30) Foreign Application Priority Data
Sep. 9, 2016  (DE) .................... 10 2016 217 187.9

(51) Int. Cl.
*F16D 48/08*    (2006.01)
*F16D 21/06*    (2006.01)
(Continued)

(52) U.S. Cl.
CPC ............ *F16D 48/08* (2013.01); *B60K 28/165* (2013.01); *B60W 10/06* (2013.01);
(Continued)

(58) Field of Classification Search
CPC ........ F16D 48/08; F16D 13/385; F16D 21/06; B60W 10/113; B60W 30/18027
See application file for complete search history.

(56) References Cited

U.S. PATENT DOCUMENTS 6,463,821 B1 *  10/2002  Reed, Jr. ............... F16D 27/112
                                                74/330
9,267,574 B2 *   2/2016  Terashima ................ F16H 3/08
(Continued)

FOREIGN PATENT DOCUMENTS

CN    103909924 A    7/2014
DE    38 12 327 A1   6/1989
(Continued)

OTHER PUBLICATIONS

Definition of "base on" retrieved from www.macmillandisctionary.com (Year: 2020).*
(Continued)

*Primary Examiner* — Stacey A Fluhart
(74) *Attorney, Agent, or Firm* — Pearl Cohen Zedek Latzer Baratz LLP

(57) ABSTRACT

The invention relates to a method for carrying out a starting operation of a motor vehicle having a gear train that includes a dual clutch transmission with a first clutch that carries the odd-numbered gears, and a second clutch that carries the even-numbered gears, wherein the second clutch of the dual clutch transmission is used, at least in part, for preloading the gear train.

7 Claims, 5 Drawing Sheets

(51) Int. Cl.
*B60W 30/18* (2012.01)
*B60W 30/186* (2012.01)
*B60W 10/06* (2006.01)
*B60W 10/113* (2012.01)
*B60K 28/16* (2006.01)
*F16D 13/38* (2006.01)
*F16H 61/688* (2006.01)

(52) U.S. Cl.
CPC ........ *B60W 10/113* (2013.01); *B60W 30/186* (2013.01); *B60W 30/18027* (2013.01); *F16D 13/385* (2013.01); *F16D 21/06* (2013.01); *F16H 61/688* (2013.01); *F16D 2500/1045* (2013.01); *F16D 2500/1086* (2013.01); *F16D 2500/508* (2013.01); *F16D 2500/50206* (2013.01); *F16H 2312/022* (2013.01)

(56) References Cited

U.S. PATENT DOCUMENTS

| | | | |
|---|---|---|---|
| 9,598,081 B2 * | 3/2017 | Mair | F16D 48/08 |
| 2011/0186369 A1 * | 8/2011 | Richter | B60W 10/06 |
| | | | 180/65.265 |
| 2015/0226321 A1 | 8/2015 | Dunfee, II et al. | |
| 2015/0283995 A1 * | 10/2015 | Murata | B60W 30/18027 |
| | | | 477/5 |
| 2017/0268580 A1 * | 9/2017 | Dole | F16D 25/10 |
| 2019/0193719 A1 * | 6/2019 | Gluck | B60K 6/36 |

FOREIGN PATENT DOCUMENTS

| | | |
|---|---|---|
| DE | 101 56 940 A1 | 5/2003 |
| DE | 10156940 A1 | 5/2003 |
| DE | 103 08 698 A1 | 9/2003 |
| DE | 10 247970 A1 | 4/2004 |
| DE | 102 47 970 A1 | 4/2004 |
| DE | 103 05 297 A1 | 8/2004 |
| DE | 10 2013 114 958 A1 | 7/2014 |
| DE | 100 43 060 B4 | 7/2016 |
| EP | 2 752 345 A1 | 7/2014 |
| EP | 2752345 A1 | 7/2014 |
| GB | 2 509 934 A | 7/2014 |
| GB | 2509934 A | 7/2014 |

OTHER PUBLICATIONS

International Search Report of PCT Application No. PCT/EP2017/072442, dated Dec. 21, 2017.
English Translation of Search Report for Chinese Patent Application No. 2017800541095, dated Jan. 19, 2020.
Search report for German Patent Application No. 10 2016 217 187.9, dated Jun. 1, 2017.

* cited by examiner

METHOD FOR CARRYING OUT LAUNCH CONTROL STARTING OPERATIONS

CROSS-REFERENCE TO RELATED APPLICATIONS

This application is a National Phase Application of PCT International Application No. PCT/EP2017/072442, International Filing Date Sep. 7, 2017, claiming priority of German Patent Application No. 10 2016 217 187.9, filed Sep. 9, 2016, which is hereby incorporated by reference.

FIELD OF THE INVENTION

The invention relates to the field of motor vehicle transmissions, in particular a method for carrying out launch control starting operations ("race starts").

BACKGROUND OF THE INVENTION

A starting control system for a vehicle having a dual clutch transmission and a transmission control module is known from published unexamined patent application DE 10 2013 114 958 A1. Dual clutch transmissions combine certain features of manual and automatic transmissions. In a dual clutch transmission having odd-numbered and even-numbered gear sets, an input clutch is engaged in order to engage one of the odd-numbered gear sets. In addition, another input clutch is engaged in order to engage one of the even-numbered gear sets. An on-board transmission controller predicts the next gear to be selected, using available controller inputs such as acceleration of the engine and the braking level, and then commands engagement of the next gear at the start of the imminent shifting. In comparison to a conventional transmission, a dual clutch transmission can provide faster gear shifting, generally with improved shift control and increased power.

The transmission control module in DE 10 2013 114 958 A1 is used to carry out a starting control method. An engine control module and the transmission control module cooperate during starting of the vehicle in order to ultimately compute and modify, over time, a position control signal for controlling a position of a particular one of the input clutches of the dual clutch transmission. Lastly, the position signal commands an engagement position of the given input clutch, i.e., an axial position of the piston or some other actuator(s) that is/are used for engaging the input clutch.

A method for controlling a starting operation of a motor vehicle that is selectable by the driver in conjunction with a race starting operation ("launch control") is known from published unexamined patent application DE 103 05 297 A1. This launch control allows optimal vehicle acceleration on a roadway with good traction. This known launch control is selected by deactivating the traction control system when the vehicle is stationary, selecting a special driving program, bringing the gear selector lever into a certain position with the vehicle stationary, and actuating the accelerator pedal. The launch control is initialized by adjusting the engine speed to a fixed value with the clutch still disengaged. Releasing the brake pedal accelerates the vehicle; i.e., the initialized starting operation is subsequently continued in terms of optimal acceleration by clutch control.

In the known method for carrying out launch control starting operations, the drive train is already preloaded prior to the actual start by partially engaging the clutch associated with the starting gear. Since the same clutch is used which is placed under load during starting, this results in a very high thermal load. For reasons of component protection, the parameters that are applicable for starting and preloading (preload torque, preload speed) are therefore limited.

SUMMARY OF THE INVENTION

The object of the present invention is to provide a method and a correspondingly configured control module for carrying out a starting operation of a motor vehicle which at least partially overcomes the disadvantages mentioned above.

This object is achieved by the method according to the invention according to claim 1, and the correspondingly configured control module according to claim 9. Further advantageous embodiments of the invention result from the subclaims and the following description of preferred exemplary embodiments of the present invention.

The following exemplary embodiments concern a method for carrying out a starting operation of a motor vehicle. The motor vehicle has a gear train that includes a dual clutch transmission with a first clutch that carries the odd-numbered gears (i.e., that is associated with the sub-transmission having the odd-numbered gears), and a second clutch that carries the even-numbered gears (i.e., that is associated with the sub-transmission having the even-numbered gears). The first gear, i.e., the forward gear with the highest gear ratio, and which is used as the starting gear in the starting operation according to the invention, is thus associated with the first clutch. The second clutch of the dual clutch transmission is used, at least in part, for preloading the gear train. Unnecessary thermal load on the first clutch which is required for starting is thus avoided due to the preloading phase, and optimal use is made of design advantages.

According to one preferred embodiment, the preloading of the gear train is based entirely on the second clutch of the dual clutch transmission. The thermal load on the first clutch which is required for starting may thus be optimally reduced.

According to alternative exemplary embodiments, the preloading of the gear train is based partly on the second clutch of the dual clutch transmission and partly on the first clutch of the dual clutch transmission. In this way the thermal load is distributed over both clutches, and the thermal load on the first clutch which is required for starting is at least reduced.

For preloading the gear train, for example torque may be transmitted from an engine to the second clutch of the dual clutch transmission. The engine may be a combustion engine or an electric motor, for example, that is used as a traction motor of the motor vehicle.

The preloading of the dual clutch transmission takes place by operating the second clutch with slip. By operating the second clutch with slip, the transmission is preloaded before the motor vehicle begins to move.

After the preloading of the gear train, torque for accelerating the motor vehicle may be transmitted to the first clutch. The actual start-up may thus be carried out by the clutch of the first gear. The clutch used for the preloading is disengaged at the beginning of the start-up.

The dual clutch transmission may be based on the wet clutch type, for example. The described method may be used, for example, for a hydraulically actuated multiplate clutch of a dual clutch transmission. Applications for other types of clutches are also possible.

In one advantageous variant, the clutches in the dual clutch are radially stacked, i.e., with one clutch radially situated inside the other clutch, the first clutch being the radially outer element and the second clutch being the radially inner element. Since the cooling oil for the clutches flows radially from the inside to the outside, the radially inner clutch is directly supplied with flow by the cooling oil supply line, and is thus better cooled. The thermal load on the radially inner clutch may thus be better held to a lower level, and with a smaller quantity of cooling oil, than for the radially outer clutch. The energy requirements for the cooling oil pump may thus be reduced. Use of this method is particularly advantageous for the dual clutches having a radial design in which the cooling oil flows to the radially outer clutch through the radially inner clutch.

The starting operation may be a race start. The method may be used, for example, within the scope of a launch control. The launch control is used, for example, to provide optimal acceleration to maximum speed for a vehicle having an automated manual transmission. Within the scope of a launch control, the automatic shifter may be controlled in such a way that the rotational speed that best accelerates the vehicle from a standstill, without the wheels spinning, is present during starting.

The present invention further relates to a controller that is configured for carrying out the above-described method. The controller may be a transmission control module and/or an engine control module, for example. The method according to the invention may be implemented, for example, as a computerized method in a control module having a processor, a memory, and communication interfaces. In particular, the method may be implemented in the form of program commands that are executed on a processor, such as a transmission control module. Thus, the invention is also directed to a processor that is configured in such a way that it implements the described method, or is directed to controllers that include a processor configured in this way. A further subject matter of the present invention relates to a motor vehicle that includes such a controller.

The present invention further relates to a motor vehicle having a control module. The motor vehicle may be, for example, a vehicle having an internal combustion engine, an electric vehicle, a hybrid electric vehicle, or the like.

BRIEF DESCRIPTION OF THE DRAWINGS

Exemplary embodiments of the invention are now described by way of example with reference to the appended drawings, which show the following.

DETAILED DESCRIPTION OF THE INVENTION

Figure 1:
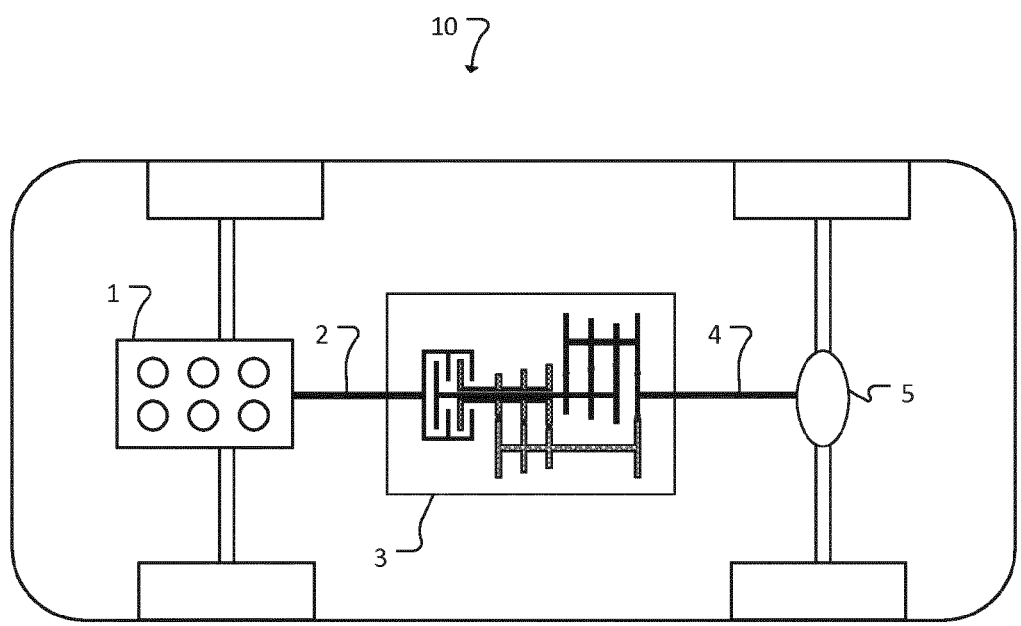
FIG. 1 schematically shows one exemplary embodiment of a drive train of a motor vehicle.

FIG. 1 schematically shows one exemplary embodiment of a drive train of a motor vehicle 10. The drive train includes a combustion engine 1 that generates an input torque and delivers this input torque to a dual clutch transmission 3 via a crankshaft 2. The output torque of the dual clutch transmission 3 is transmitted to the wheels of the motor vehicle 10 via an output shaft 4 and axle differential 5 in order to drive the motor vehicle 10.

Figure 2:
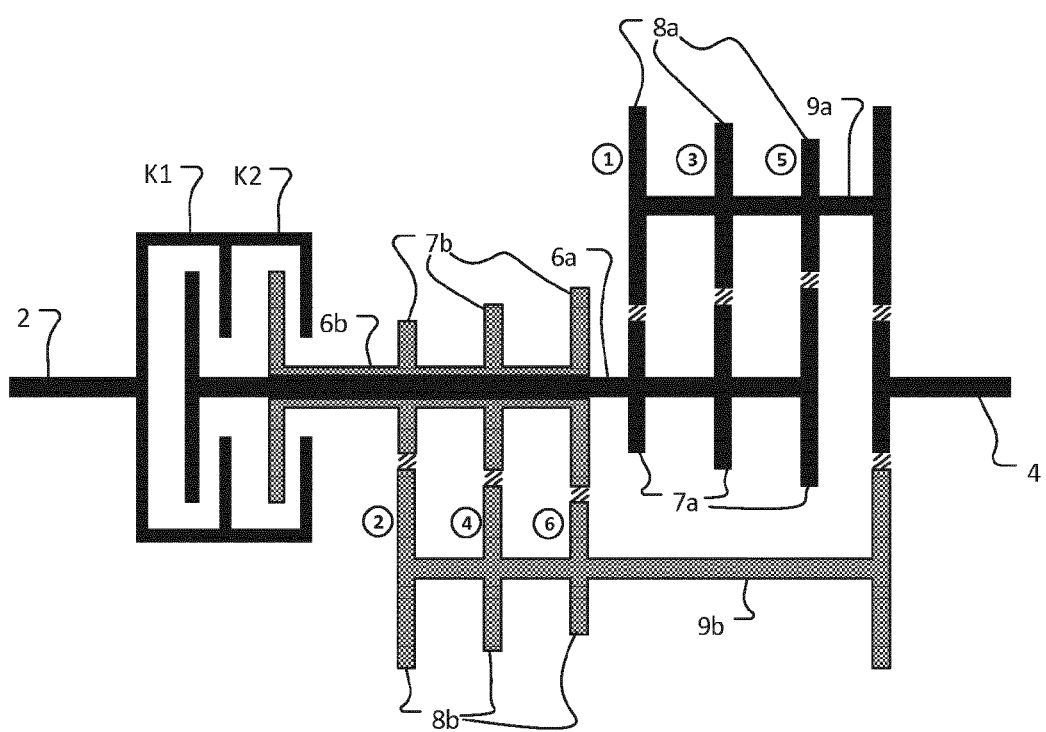
FIG. 2 schematically shows the operating principle of a dual clutch transmission.

FIG. 2 schematically shows the operating principle of the dual clutch transmission 3. As shown in the schematic illustration, the dual clutch transmission 3 is made up of two automated sub-transmissions having a clutch K1, K2, respectively. One sub-transmission carries the even-numbered gears, and the other sub-transmission carries the odd-numbered gears. In this exemplary embodiment, the clutches K1 and K2 are the wet clutch type. Associated electronic and hydraulic clutch control devices (see FIG. 3) control the shifting operation and starting of the vehicle. The dual clutch transmission 3 has a shaft 6a that is connected to the first clutch K1, and has a hollow shaft 6b that is connected to the second clutch K2. The shaft 6a is connected only to the odd-numbered gear sets 7a. The second shaft 6b is connected only to the even-numbered gear sets 7b, which include a reverse gear set. The dual clutch transmission 3 also includes upper and lower main shafts 9a and 9b, respectively, that are connected to axle drive gear sets 8a, 8b. The axle drive gear sets 8a and 8b in turn are connected to the output shaft 4 of the dual clutch transmission 3, and are designed to provide required axle gear reductions. The first clutch K1 controls all odd-numbered gear sets of the dual clutch transmission, in the present case the first, third, and fifth gears in a 6-speed transmission by way of example. The second clutch K2 controls each even-numbered gear set, in the present case the second, fourth, and sixth gears in the 6-speed transmission by way of example. Situated within the gear sets are additional clutch elements that may be engaged or disengaged to provide the desired gear. The reverse gear may be part of the odd-numbered gear set 8a, and controlled via the first clutch K1. The dual clutch transmission 3 implements an automated manual transmission, which by means of two sub-transmissions allows a fully automatic gear shift without interruption of traction.

In the above exemplary embodiment, the second clutch of the dual clutch transmission is described as the one that is connected to corresponding gear sets via a hollow shaft, whereas the first clutch is connected to corresponding gear sets via a shaft situated in this hollow shaft. The converse may be true in alternative exemplary embodiments. In this regard, the terms "first" clutch and "second" clutch are not to be construed as limiting.

Figure 3:
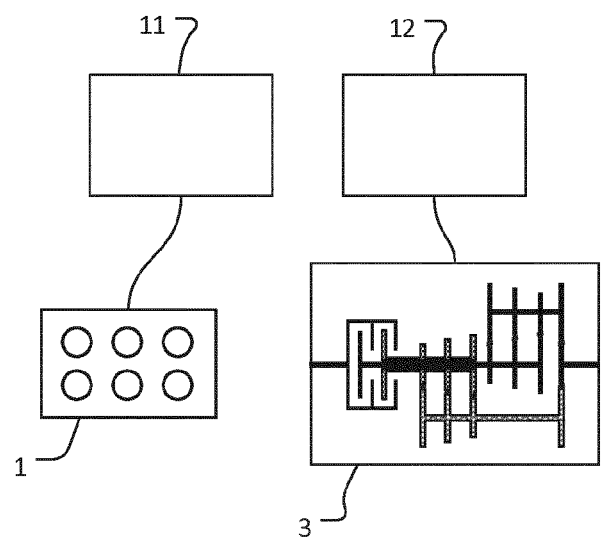
FIG. 3 shows an example of control modules of a motor vehicle.

FIG. 3 shows an example of control modules of a motor vehicle. In this exemplary embodiment, a motor vehicle has a transmission control module 11 for controlling the dual clutch transmission 3, and an engine control module 12 for controlling the combustion engine 1. The transmission control module 11 and the engine control module 12 in this exemplary embodiment are based on microprocessors, memory modules, and communication interfaces. The transmission control module 11 and the engine control module 12 are programmed to execute the required steps of the starting control method according to the invention, for example the method described below with reference to FIGS. 4a, 4b, and 5.

Figure 4A:
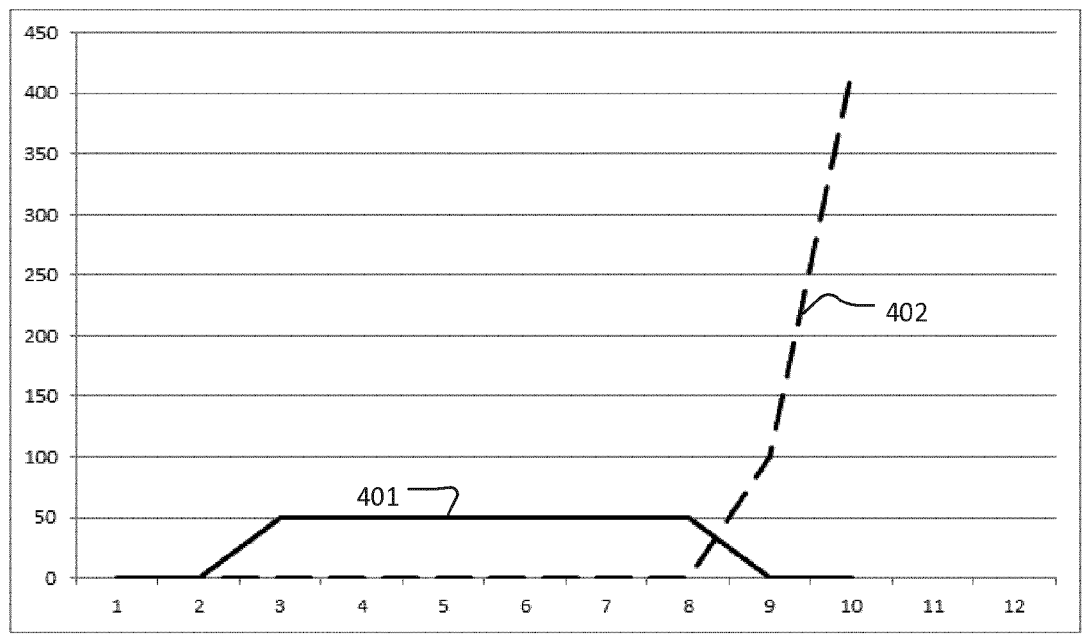
FIG. 4a shows an example of a starting operation according to the present invention in a diagram.

FIG. 4a shows an example of a starting operation according to the invention in a diagram. In the diagram, on the one hand the torque 401 exerted by the combustion engine on the second sub-transmission of a dual clutch transmission carrying the even-numbered gears (straight line), and on the other hand, the torque 402 exerted by the internal combustion engine on the first sub-transmission of the dual clutch transmission carrying the odd-numbered gears (dashed line), are plotted as a function of time. At the beginning of the starting operation, the dual clutch transmission is configured by the transmission controller in such a way that that the first gear of the dual clutch transmission (first sub-transmission) and the second gear of the dual clutch transmission (second sub-transmission) are engaged at the same time. The starting operation begins at point in time 2, in that a preload torque of 50 Nm is transmitted to the second clutch K2 of the dual clutch transmission. The second clutch K2 is operated with slip, so that the gear train of the motor vehicle is preloaded without the motor vehicle already accelerating. The frictional heat generated by operation of the clutch with slip flows into the second sub-transmission, in particular into the clutch plates of the second clutch K2, and heats them up, and is at least partially removed by coolant provided for cooling the second sub-transmission. The preloading phase is ended by the transmission controller at point in time 5. The torque 401 that has been transmitted to the second clutch K2 is transmitted by the transmission controller to the first clutch K1 instead of to the second clutch K2 in an "overblended" manner, in which the first gear is already pre-engaged. The actual acceleration operation of the vehicle begins by increasing the torque 402 on the first clutch K1. The first clutch is completely or partially engaged by the transmission controller. The vehicle is accelerated by the transmission of torque to the wheels. The exact torque pattern during the acceleration operation depends on the driver intent. In the example shown here, the torque reaches its maximum at point in time 9, and decreases after this point in time. The starting operation is terminated at point in time 11. As the result of using the second clutch K2 for the preloading phase, heating of the first clutch K1, in particular the clutch plates of the first clutch K1, is avoided during the preloading. The first sub-transmission may thus be subjected to higher load during the actual acceleration operation than if it had already been heated by the preloading process.

The time scale in FIG. 4a has been selected strictly by way of example. The preloading phase (points in time 2 through 8 in FIG. 4a) may last for 6 to 10 s, for example. The torque buildup up to maximum torque (points in time 8 through 10 in FIG. 4a) may take place in less than 1 s.

Figure 4B:
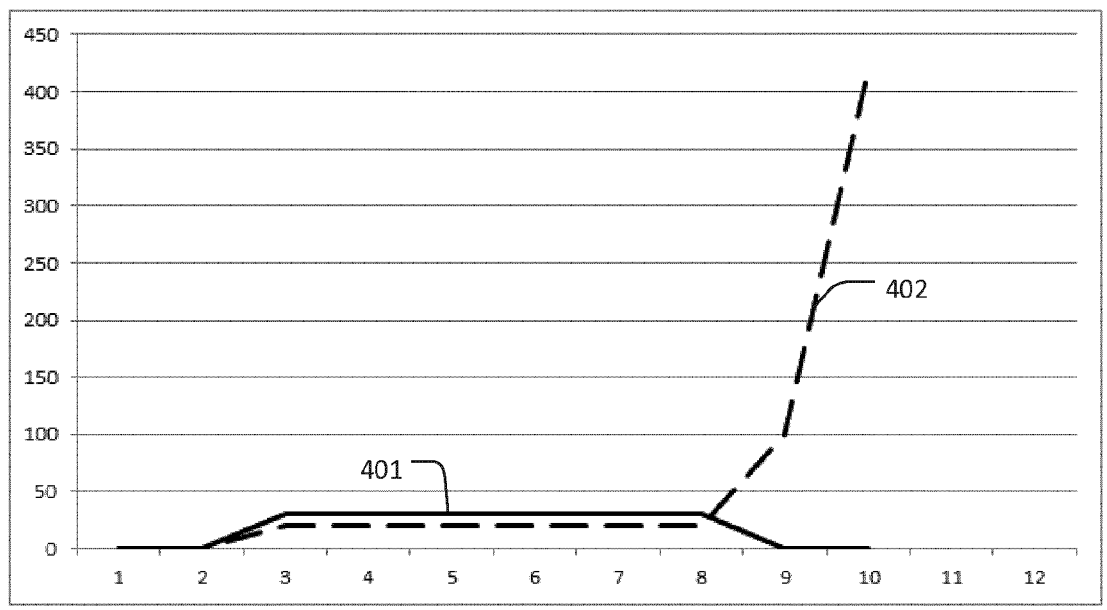
FIG. 4b shows another example of a starting operation according to the present invention in a diagram.

FIG. 4b shows another example of a starting operation according to the invention in a diagram. In the diagram, once again on the one hand the torque 401 exerted by the combustion engine on the second sub-transmission of a dual clutch transmission carrying the even-numbered gears (straight line), and on the other hand, the torque 402 exerted by the internal combustion engine on the first sub-transmission of the dual clutch transmission carrying the odd-numbered gears (dashed line), are plotted. In contrast to FIG. 4a, the second gear of the dual clutch transmission (second sub-transmission) as well as the first gear of the dual clutch transmission (first sub-transmission) are used for preloading the gear train. In the example shown here, 30 Nm of the preload torque is transmitted to the second clutch K2, and 20 Nm of the preload torque is transmitted to the first clutch K1. Heating of the first clutch, in particular the clutch plates of the first clutch K1, is reduced due to at least partially using the second clutch for the preloading phase. The first sub-transmission may thus be subjected to higher load during the acceleration operation than when it has to apply the entire preload torque by itself.

The exemplary embodiments shown in FIGS. 4a and 4b are to be understood strictly by way of example. It is apparent to those skilled in the art that a transmission controller according to the invention may arbitrarily distribute the preload torque over the first clutch and the second clutch. When torque is transmitted, at least in part, to the second clutch K2 instead of to the first clutch K1 for the preloading of the gear train, less heat is transmitted to the first sub-transmission than if only the first clutch K1 were used for the preloading of the gear train.

Figure 5:
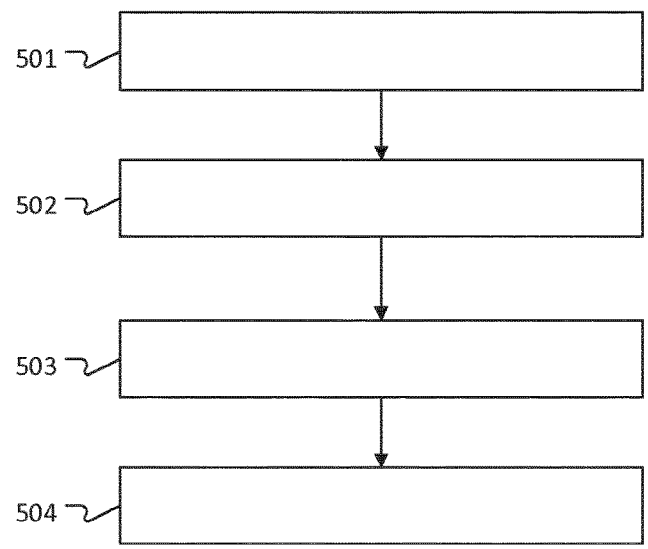
FIG. 5 shows a schematic flow chart of an example of a method for carrying out a starting operation according to the present invention.
Figure 6:
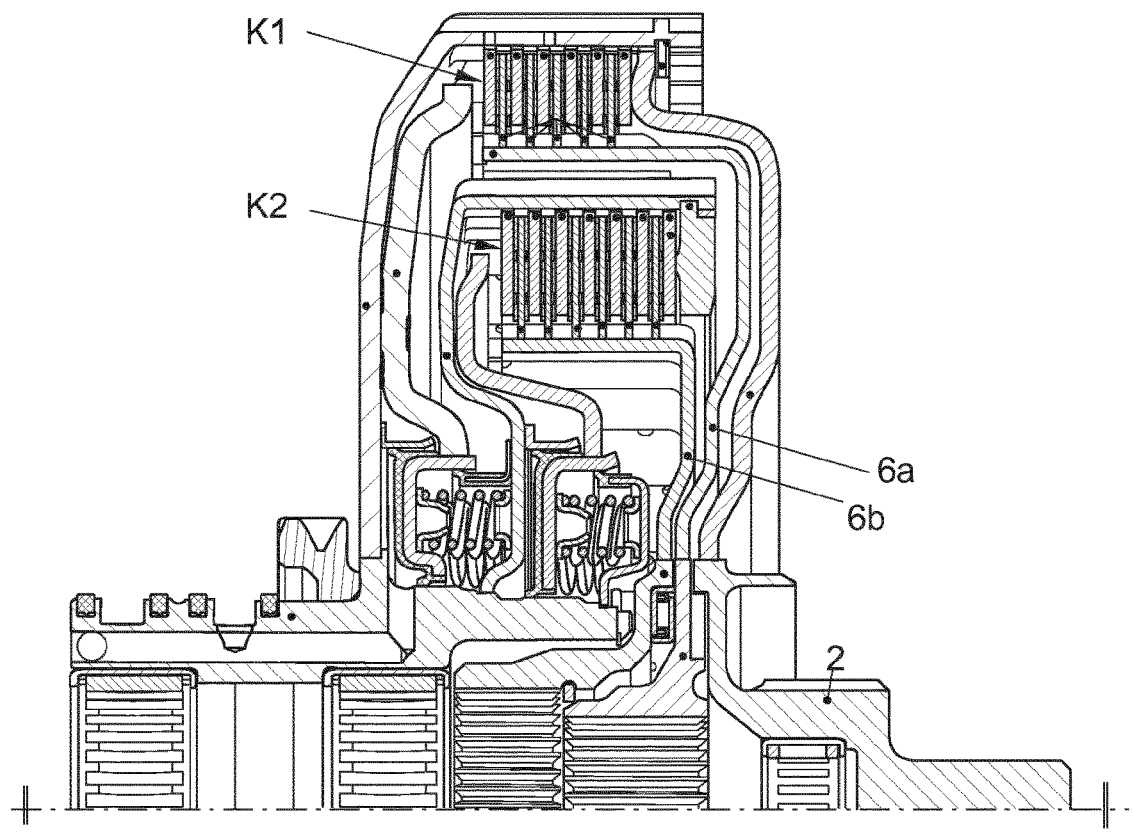
FIG. 6 shows a dual clutch with wet clutches, in a radial design in which the second clutch is situated radially inside the first clutch.

FIG. 5 shows a schematic flow chart of an example of a method for carrying out a starting operation according to the present invention. The first and the second gear of the dual clutch transmission are engaged in step 501. The second sub-clutch is engaged in step 502, so that a preload torque is transmitted to the second gear during operation with slip. The second sub-clutch is once again disengaged in step 503, and instead, the first sub-clutch of the dual clutch transmission is engaged, thus overblending the torque on the first gear that is generated by the combustion engine. The torque of the combustion engine is rapidly increased in step 504 in order to carry out an acceleration operation of the motor vehicle according to driver intent.

In the above exemplary embodiments, the second gear (on the second sub-transmission) is used for preloading the gear train. However, it is apparent to those skilled in the art that in alternative exemplary embodiments, gear 4 or 6 could also be used for preloading the gear train.

LIST OF REFERENCE NUMERALS

1 combustion engine
2 crankshaft
3 dual clutch transmission
4 output shaft
5 axle differential
6a shaft
6b hollow shaft
7a odd-numbered gear sets (first sub-transmission)
7b even-numbered gear sets (second sub-transmission)
8a axle drive gear sets (first sub-transmission)
8b axle drive gear sets (second sub-transmission)
9a main shaft (first sub-transmission)
9b main shaft (second sub-transmission)
10 motor vehicle
11 transmission control module
12 engine control module
K1 sub-clutch (first sub-transmission)
K2 sub-clutch (second sub-transmission)
401 torque (first sub-transmission)
402 torque (second sub-transmission)
501 engagement of the first and second gears
502 engagement of the second sub-clutch
503 disengagement of the second sub-clutch and engagement of the first sub-clutch
504 increase in the torque

The invention claimed is:

1. A method for carrying out a starting operation of a motor vehicle having a gear train that includes a dual clutch transmission having a first clutch that carries the odd-numbered gears, and a second clutch that carries the even-numbered gears, the method comprising:
   using the second clutch of the dual clutch transmission, and engaging one of the even-numbered gears for preloading the gear train before the motor vehicle begins to move,
   wherein the preloading of the gear train is based entirely on the second clutch of the dual clutch transmission, and
   wherein the preloading of the dual clutch transmission takes place by operating the second clutch with slip and by transmitting a preload torque to the engaged one of the even-numbered gears during operation with slip.

2. The method according to claim 1, wherein, for preloading the gear train, torque is transmitted from an engine to the second clutch of the dual clutch transmission.

3. The method according to claim 1, wherein, after the preloading of the gear train, torque for accelerating the motor vehicle is transmitted to the first clutch.

4. The method according to claim 1, wherein the dual clutch transmission is based on the wet clutch type.

5. The method according to claim 1, wherein the second clutch is situated radially inside the first clutch, in particular a cooling oil flowing to the first clutch through the second clutch.

6. A controller that is configured for carrying out the method according to claim 1.

7. A motor vehicle having a control module according to claim 1.

* * * * *